United States Patent [19]
Rathbun

[11] 4,212,038
[45] Jul. 8, 1980

[54] DOUBLE DENSITY READ RECOVERY

[75] Inventor: Donald J. Rathbun, Andover, Mass.

[73] Assignee: Honeywell Information Systems Inc., Waltham, Mass.

[21] Appl. No.: 866,441

[22] Filed: Jan. 3, 1978

[51] Int. Cl.[2] .................. H03K 13/24; G11B 5/09
[52] U.S. Cl. .................................. 360/41; 364/900; 340/347 DD
[58] Field of Search ... 364/200 MS File, 900 MS File; 360/41, 43, 44, 48; 340/347 DD

[56] References Cited

U.S. PATENT DOCUMENTS

| | | | |
|---|---|---|---|
| 3,905,029 | 9/1975 | McIntosh | 360/41 |
| 3,976,996 | 7/1976 | Wu | 360/41 |
| 4,034,348 | 7/1977 | Rathburn | 364/900 |

*Primary Examiner*—Gareth D. Shaw
*Assistant Examiner*—C. T. Bartz

*Attorney, Agent, or Firm*—Ronald T. Reiling; Nicholas Prasinos; Gerald E. Lester

[57] ABSTRACT

A logic system requiring no tuning adjustments is provided for converting an MFM encoded information stream read from a mass storage medium to a non-return-to-zero (NRZ) information stream. The MFM encoded information stream is routed through an input shift register to provide plural information bit cells in parallel. Outputs of the shift register are sampled with a multiplexer to generate timing strobes for detecting an address mark, and for identifying clock bits, data bits and logic zero data appearing in the MFM encoded data field following the address mark. Clock bits are separated from the data, and both data bits and logic zero data are applied serially to an output shift register to form a serial NRZ data stream. Each time a data bit or logic zero data is loaded into the output shift register, a synchronization strobe is generated to transfer the NRZ data to succeeding systems.

3 Claims, 19 Drawing Figures

DOUBLE DENSITY READ RECOVERY

FIELD OF THE INVENTION

The invention relates to a system for converting an encoded information stream to an NRZ format, and more particularly to a logic system requiring no tuning adjustments for separating an MFM encoded information stream into an NRZ information stream and a train of synchronization strobes.

PRIOR ART

The need for higher density recording of digital information on a magnetic medium has fostered the development of numerous encoding schemes including both phase and frequency encoding. With increased data processing speeds placing greater emphasis on high density magnetic recording, resort has been had to frequency modulated (FM) and modified frequency modulated (MFM) binary information streams. The FM and MFM information streams are generally referred to as single density and double density encoded information, respectively.

FM or single density read recovery is disclosed in U.S. Pat. No. 4,034,348 to Rathbun, wherein feedback loops are used to generate timing strobes for detecting both clock and data bits. Further, MFM or double density encoding has been disclosed in a Control Data Corporation project note entitled "MFM Double Density FDD System", and dated Nov. 16, 1976. The insertion of an illegal logic zero clock signal in the address mark field to provide an address mark, and the use of delay lines to accommodate a read recovery also are disclosed.

The read recovery systems in general have been comprised of frequency sensitive devices such as delay lines, variable frequency oscillators (VFOs), phase lock oscillators (PLOs) and feedback loops for generating timing strobes. The delay lines have exhibited a limited accuracy which is unacceptable in contemporary data processing systems. The VFO and PLO systems must be tuned to the rate at which information is to be received from a storage medium. When the VFO or PLO tuned frequency drifts or the system architecture is changed, a retuning is required to prevent read errors. The accuracy of VFO and PLO systems in addition is affected by the occurrence of write splices which may be present in the information stream as a result of an updating of data records on the storage medium. The delay lines, VFOs and PLOs further are not compatible with integrated circuit implementation. Those read recovery systems using the feedback loop method of generating timing strobes are the more complex of the prior art systems. Because of the complexity, feedback loops have been limited to FM read recovery systems.

The present invention is directed to a logic system for converting MFM encoded information to an NRZ information stream without the use of delay lines, VFOs, PLOs, or timing strobe feedback loops. The read recovery system is compatible with integrated circuit implementation insensitive to the occurrence of write splices in the information stream, and requires no adjustments or tuning.

SUMMARY OF THE INVENTION

A logic read recovery system requiring no tuning adjustments for converting MFM encoded information read from a magnetic medium into NRZ (non-return-to-zero) information and a train of timing strobes is provided. The system is insensitive to the occurrence of write splices in the MFM information stream and compatible with integrated circuit implementation.

More particularly, each bit half-cell of plural information bit cells in the MFM information stream are sampled to detect an address mark, and to identify clock and data logic signals occurring in the data field following the address mark. The clock signals are separated from the data signals to form an NRZ information stream and a train of synchronization strobes for transferring the NRZ information to succeeding systems.

In one aspect of the invention, logic one bits occurring in the MFM information stream are applied serially through an input shift register to provide a plural information bit cell window. Outputs of the input shift register are sampled by a multiplexer in response to a control signal indicating the occurrence of clock bits in the MFM information stream. Timing strobes for controlling the operation of the logic read recovery system are generated thereby.

In another aspect of the invention, the information bit process rate in identifying clock or data bit types is increased by identifying bits occurring less than 1.25 information bit cell periods or more than 1.75 information bit cell periods apart as being of the same type, and by identifying bits occurring between 1.25 and 1.75 information bit cell periods apart as being of different types. The bit process rate further is enhanced by removing an information bit from the input shift register when the information bit has been identified as a data bit or a clock bit.

DESCRIPTION OF THE DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

FIG. 1

Figure 1:
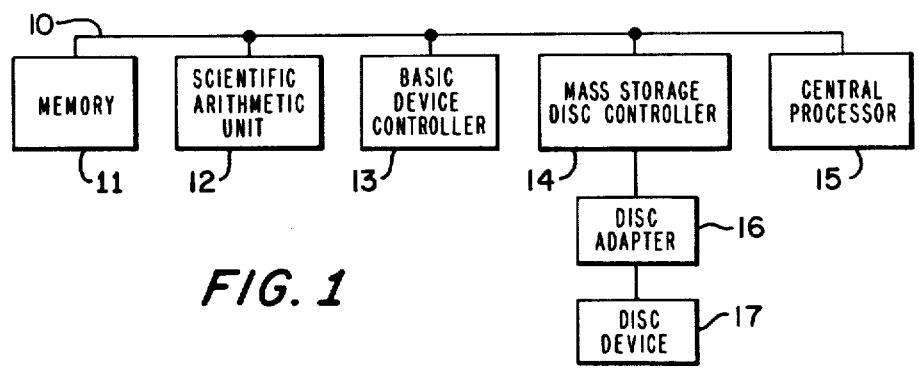
FIG. 1 is a functional block diagram of a data processing system embodying the invention.

FIG. 1 illustrates in functional block diagram form a data processing system embodying the invention.

The data processing system includes a plurality of units coupled to a common bus 10 for the transfer of information during asynchronously generated information bus transfer cycles. The asynchronous design of the bus enables units of various speeds to operate efficiently in the same system. Communicates including memory transfers, interrupts, data transfers, status and command transfers are permitted.

More particularly, common bus 10 permits any two units to communicate at a given time over a common signal path. Any unit having a communication requirement requests a bus cycle. When the bus cycle is granted, the requesting unit becomes the master and may address any other unit in the system as its slave. Most transfers are in the direction of master to slave. Some types of bus interchanges, however, require a response cycle wherein the requesting unit indicates that a response is required. The requesting unit identifies itself to the slave, and when the required information becomes available, the slave assumes the role of the master and initiates a transfer to the requesting unit. An interchange between the two units thereby is accomplished within two bus cycles. Intervening time on the bus between the two cycles may be used for other system traffic not involving the two units.

In a typical system, a multi-line common bus 10 is coupled to a memory unit 11, a scientific arithmetic unit 12, a basic device controller 13 for controlling unit record peripheral devices, a mass storage disc controller 14 and a central processor 15. The controller 14 is a microprogramming process which executes instructions contained in a channel program to control the operation of a disc adapter 16. The disc adapter mediates between the controller 14 and the disc device 17 upon which data is to be written or from which data is to be read.

Priority is granted on the basis of physical position on the bus, with the highest priority being given to the memory unit 11 and the lowest priority being given to the central processor 15. The remaining control units are positioned on the basis of their performance requirements. A channel number is assigned to each of the devices with the exception of the memory unit 11 which is identified by memory address. Full duplex devices as well as half-duplex devices utilize two channel numbers. Those devices having input only or output only operations use one channel number each.

As previously discussed, the master may address any other device on the bus as a slave. The master places the slave channel number on the address lines of the bus 10. Each unit compares the number with its own internally stored channel number, and upon detecting an equivalence becomes the slave and responds to the bus cycle. If the master requires a return response cycle as would occur in a read operation, the master provides its own channel number to the slave.

FIG. 2

Figure 2:
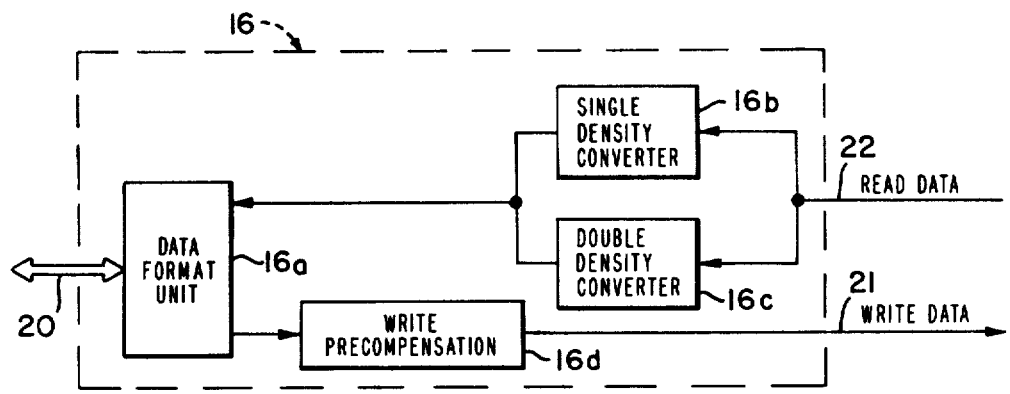
FIG. 2 is a functional block diagram of the disc adapter of FIG. 1.

The invention disclosed herein is embodied in the disc adapter 16. FIG. 2 illustrates the disc adapter in a more detailed functional block diagram form.

The adapter is comprised of a data format unit 16a, a single density converter 16a, a double density converter 16c and a write precompensation unit 16d.

A binary information stream is received serially from the controller 14 on data line 20, and formatted by the data format unit 16a for recording on a disc unit. The write precompensation unit 16d either FM (frequency modulation) or MFM (modified frequency modulation) encodes the formatted information stream, and reduces the magnitude of peak shifts caused by clock and data pulse interactions. The precompensated MFM information stream is forwarded to the disc device 17 by way of a data line 21.

When data is to be read from the disc device, the data is received serially on a data line 22 and applied either to the single density converter 16b or to the double density converter 16c. The selected converter decodes the MFM disc data, and the decoded data is forwarded to the data format unit 16a. The format unit produces a clock signal from the decoded data at twice the data rate, and stabilizes the clock signal to track the recovered data over its inherent time variations. The encoded disc data thereby is converted to NRZ data for transfer to the common bus 10.

FIG. 3

Figure 3:
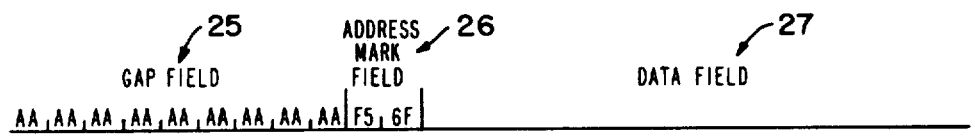
FIG. 3 is a diagram of a frequency modulated binary information stream.

FIG. 3 illustrates graphically a frequency modulated (FM) binary information stream to be written on a disc device, and thereafter sampled and recovered during a read operation. Each information bit cell is four microseconds in width, and is comprised of both a two-microsecond clock half-cell and a two-microsecond data half-cell.

The information stream format includes a gap field 25, and an adjacent address mark field 26 contiguous to a data field 27. The gap field is of sufficient length to provide system synchronization, and the address mark field and data field may be of any length.

An address mark occurring within the address mark field 26 signals the near proximity of a data record in the data field 27. More particularly, the address mark field is identified by a leading four consecutive binary one bits followed by three consecutive logic zero clocks. A clock bit is always present in both the gap and data field information bit cells. In the address mark field, however, three consecutive logic zero clocks are inserted for the purpose of providing an address mark signalling the occurrence of the data field.

FIG. 4

Figure 4:
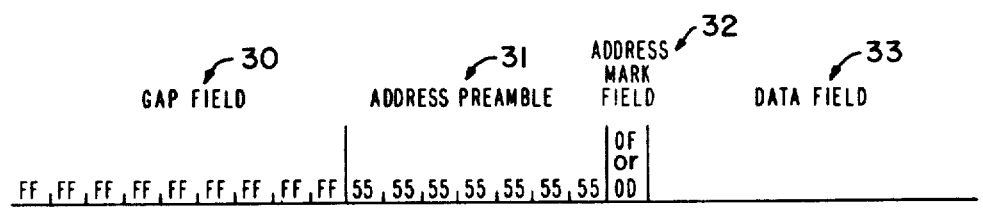
FIG. 4 is a diagram of a binary information stream formatted for an MFM encoding and recording on the disc device of FIG. 1.

FIG. 4 graphically illustrates a binary information stream which has been formatted for a double density or modified frequency modulation (MFM) encoding.

The information stream of FIG. 4 is characterized by two-microsecond wide information bit cells, each comprised of a one-microsecond clock bit half-cell and a one-microsecond data bit half-cell. The information bit stream further is formatted into a gap field 30, an address preamble field 31, an address mark field 32 and a data field 33. The gap field and the address preamble field are comprised entirely of data bits, and are void of clock bits.

The address mark field 32 following the address preamble field 31 is comprised of either a hexidecimal OD or a hexidecimal OF data bit pattern. In accordance with the normal rules for MFM encoding, no clock bit is included within an information bit cell having a data bit and following an information bit cell having a data bit. A clock bit also is excluded if an information bit cell having logic zero data follows an information bit cell having a data bit. If a first information bit cell having logic zero data follows an information bit cell having logic zero data, however, a clock bit is included in the clock half-cell of the first information bit cell.

In the address mark field of the binary information stream of FIG. 4, the clock bit which normally would appear in the third bit cell of the high order half-byte of the address mark field is suppressed to signal the imminent occurrence of a data field.

An $M^2FM$ address mark field is generated thereby wherein clock bits do not occur in consecutive bit cells. Rather, clock bits occur only in every other bit cell.

After the data field following the address mark field illustrated in FIG. 4 has been MFM encoded, no clock bits occur in bit cells having a data bit. In those information bit cells not having data bits, a clock bit is included if the previous information bit cell had logic zero data but excluded if the previous information bit cell had a data bit.

FIG. 5

Figure 5:
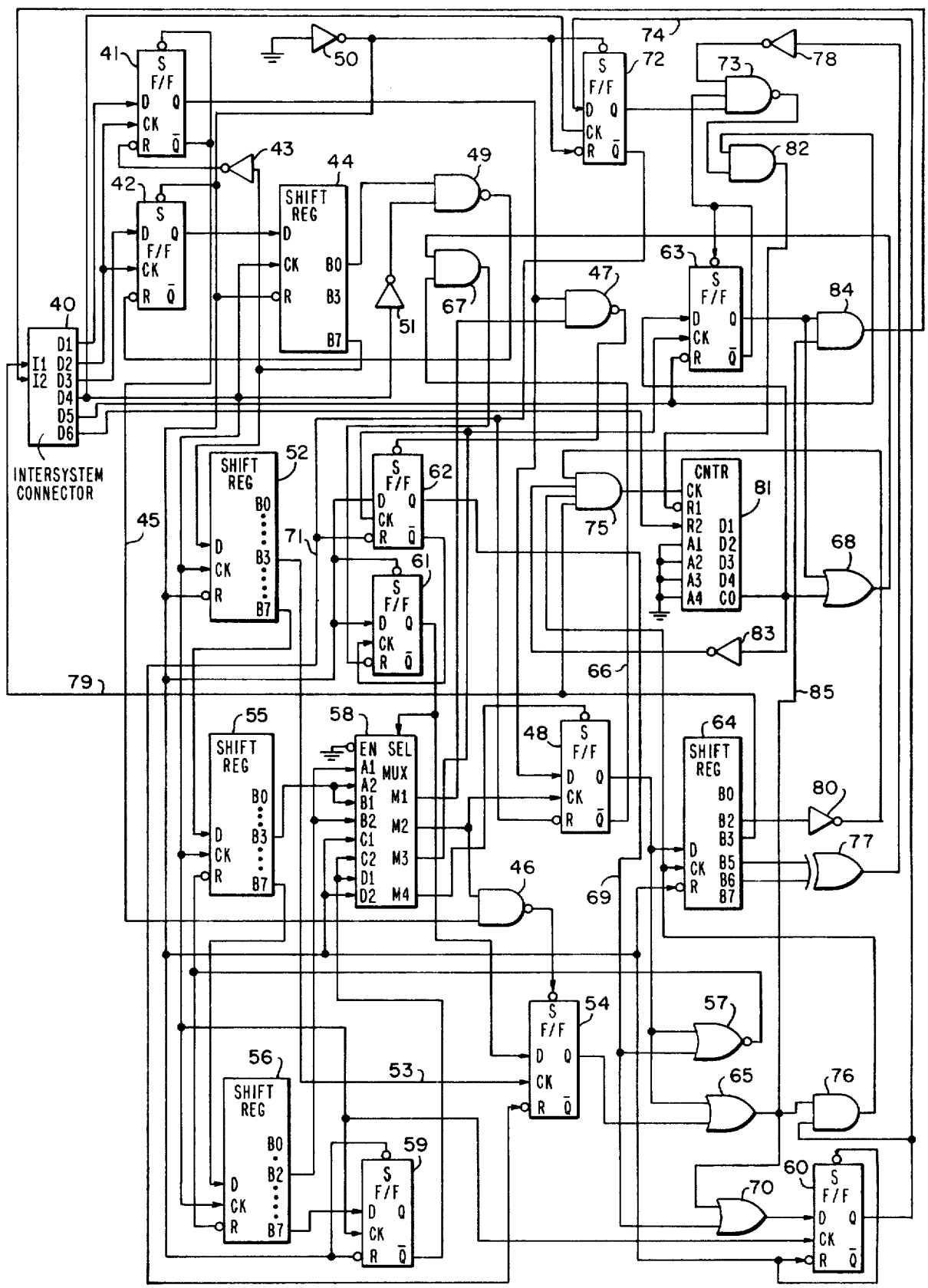
FIG. 5 is a detailed electrical schematic of a logic system embodying the invention.

FIG. 5 illustrates in detailed logic schematic diagram form the double density converter 16c of FIG. 2.

In referring to the electrical schematic illustrated in FIG. 5 it is to be understood that the occurrence of a small circle at the input of a logic device indicates that the input is enabled by a logic zero. Further, a circle appearing at an output of a logic device indicates that when the logic conditions for that particular device are satisfied, the output will be a logic zero.

An intersystem connector 40 links the data paths between the logic system of FIG. 5, the disc device 17 and the data format unit 16a. The D1 output of connector 40 is applied to the D input of a D-type flip-flop 41, the clock input of which is connected to the D2 output of connector 40 and to the clock input of a D-type flip-flop 42. The reset input to flip-flop 41 is supplied by an inverter 43 having an input connected to the bit 7 (B7) output of an eight bit serial-in-parallel-out (SIPO) shift register 44. The $\overline{Q}$ output of the flip-flop 41 is connected to the set input of the flip-flop, and connected by way of a conducting line 45 to an input of a NAND gate 46. The Q output of flip-flop 41 is applied to one input of a NAND gate 47, and to the D input of a D-type flip-flop 48.

The D input to flip-flop 42 is connected to the D3 output of connector 40, and the reset input to the flip-flop is connected to the output of a NAND gate 49. The Q output of flip-flop 42 is connected to the D input of shift register 44, and the set input to the flip-flop is connected to the output of an inverter 50 having a grounded input.

The clock input to shift register 44 is connected to the D4 output of connector 40, and the reset input to the shift register is connected to the output of inverter 50. The bit 0 (B0) output of shift register 44 is connected to an input of NAND gate 49, a second input of which is connected to the output of an inverter 51 having an input connected to the D4 output of connector 40. The B7 output of shift register 44 also is connected to the D input of an eight bit SIPO shift register 52, the clock input of which is connected to the D4 output of connector 40. The reset input to shift register 52 is connected to the reset input to shift register 44, and the bit 3 (B3) output of the shift register is applied by way of a conducting line 53 to the clock input of a D-type flip-flop 54. The B7 output of shift register 52 is connected to the D input of an eight bit SIPO shift register 55, the clock input of which is connected to the clock input of shift register 52 and to the D4 output of connector 40. The reset input to shift register 55 is connected to the reset input of an eight bit SIPO shift register 56, and to the output of a NOR gate 57. The B3 output of shift register 55 is connected to the A2 and B1 inputs of a two-to one multiplexer 58 having four multiplexing stages. The B7 output of shift register 55 is connected to the D input of shift register 56.

The clock input to shift register 56 is connected to the clock input of shift register 55, to the clock input of a D-type flip-flop 59 and to the clock input of a D-type flip-flop 60. The bit 2 (B2) output of shift register 56 is connected to the A1 and B2 inputs of multiplexer 58, and the B7 output of the shift register is connected to the D input of flip-flop 59. The set and reset inputs to flip-flop 59 are each connected to the output of inverter 50.

Shift registers 44, 52, 55 and 56 are connected to provide a 32 bit SIPO shift register for selectively sensing an information bit over a four microsecond time interval.

The enable input to multiplexer 58 is connected to ground, and the C1 input to the multiplexer is connected to its D2 input and to the output of inverter 50. The C2 input of multiplexer 58 is connected to the D1 input of the multiplexer, and to the $\overline{Q}$ output of flip-flop 59. The select input to multiplexer 58 is connected to the Q output of a D-type flip-flop 61 and to the D input to flip-flop 54. The M1 output of multiplexer 58 is applied to a second input of NAND gate 47, and the M2 output of the multiplexer is connected to the clock input to flip-flop 48 and to one input of NAND gate 46. The M3 output of multiplexer 58 is applied to the clock input of a D-type flip-flop 62 and to the clock input of a D-type flip-flop 63. The M4 output of multiplexer 58 is connected to the set input of flip-flop 48.

Referring to flip-flop 48 at the output of multiplexer 58, the reset input to the flip-flop is connected to the reset input of flip-flop 62. The Q output of flip-flop 48 is connected to the D input of an eight bit SIPO shift register 64, to one input of NOR gate 57 and to one input of an OR gate 65. The $\overline{Q}$ output of flip-flop 48 is connected by way of a control line 66 to an input of an AND gate 67.

A second input to gate 67 is connected to the output of an OR gate 68, and the output of gate 67 is connected to the reset input of flip-flop 61. The set input to flip-flop 61 is connected to the D input of flip-flop 62, to the D input of flip-flop 61 and to the output of inverter 50. The clock input to flip-flop 61 is connected to the $\overline{Q}$ output of flip-flop 62.

The Q output of flip-flop 62 is connected by way of a control line 69 to a second input of gate 57 and to one input of an OR gate 70. The reset input to flip-flop 62 also is connected by way of a control line 71 to the reset input of flip-flop 54, and to the $\overline{Q}$ output of a D-type flip-flop 72.

The set and reset inputs to flip-flop 72 each are connected to the output of inverter 50, and the clock input to the flip-flop is connected to the D4 output of connector 40. The Q output of flip-flop 72 is applied to an input of a NAND gate 73, and the D input to the flip-flop is connected by way of a control line 74 to the Q output of flip-flop 60.

The Q output of flip-flop 60 also is connected to an input of an AND gate 76, and the D input to the flip-flop is connected to the output of gate 70. The reset and set inputs to the flip-flop 60 each are connected to the output of inverter 50 and to the reset input of shift register 64.

The clock input to shift register 64 is connected to the output of gate 76, and to an input of an AND gate 75. The bit 6 (B6) output of the shift register is connected to one input of an EXCLUSIVE OR gate 77. The output of gate 77 is connected through an inverter 78 to a second input of gate 73. The B5 output of shift register 64 is connected to a second input of gate 77, and the B3 output of the shift register is connected by way of a control line 79 to the I1 input of connector 40 leading to the data format unit 16a of FIG. 2. The B3 output of the shift register 64 also is connected to a second input of gate 75. The B2 output of shift register 64 is applied through an inverter 80 to a third input of gate 75, the output of which is connected to the clock input of a four bit binary counter 81.

A first reset input (R1) to counter 81 is connected to the output of an AND gate 82 having one input connected to the output of gate 73. A second reset input (R2) to the counter is connected to the D6 output of connector 40 which is in electrical communication with disc controller 14. The A1–A4 inputs to counter 81 are each connected to ground. The carry-out (CO) output of the counter is connected through an inverter 83 to a fourth input of gate 75, to an input of OR gate 68 and to the D input of flip-flop 63.

The reset input to flip-flop 63 is connected to a second input of gate 82 and to the D5 output of connector 40. The $\bar{Q}$ output of flip-flop 63 is connected to its set input and to a third input of gate 73. The Q output of flip-flop 63 is connected to a second input of OR gate 68, and to one input of an AND gate 84 having an output connected to the I2 input of connector 40 leading to the data format unit 16a. A second input to gate 84 is connected by way of a control line 85 to the output of OR gate 65. The output of gate 65 also is connected to a second input of gate 76 and to a second input of gate 70. A second input to gate 65 is connected to the Q output of flip-flop 54. The D input to flip-flop 54 is connected to the select (SEL) input to multiplexer 58, and the set input to the flip-flop is connected to the output of gate 46.

Before the operation of the logic system of FIG. 5 is described with respect to particular MFM bit patterns, a brief explanation of the function of particular components of the logic system shall be given. In operation, the disc controller 14 issues logic one control pulses by way of the D1 and D3 outputs of connector 40 to the D inputs of flip-flops 41 and 42, respectively. MFM encoded information recorded on the disc device is read serially and applied by way of the D2 output of connector 40 to the clock inputs of flip-flops 41 and 42. Upon the occurrence of an information bit in the MFM information stream, the flip-flops 41 and 42 are clocked to provide logic one levels at their respective Q outputs. Each time an information bit occurs in the MFM data stream, it is applied by flip-flop 42 to the D input of the shift register 44.

The shift registers 44, 52, 55 and 56 comprise a 32 bit shift register wherein the data bits are shifted at an 8 MHz rate under the control of a clock signal from disc controller 14 appearing at the D4 output of connector 40. In order to compensate for peak shifts which may occur in the data stream, the flip-flop 59 is added to the output of shift register 56 and clocked at an 8 MHz rate to provide an additional one sixteenth cell period in the data stream.

As soon as an information bit is loaded into the shift register 44, the B0 output of the shift register is applied through the NAND gate 49 to reset the flip-flop 42. The MFM encoded information stream thereby is synchronized to the 125 nanosecond clock pulses appearing at the D4 output of connector 40. Upon the occurrence of an additional seven shifts within the shift register 44, the information bit appears at the B7 output of the shift register to reset the flip-flop 41. Four shifts later, the information bit appears at the B3 output of shift register 52 to trigger the flip-flop 54. One microsecond thereafter, the information bit appears at the B3 output of shift register 55 and is applied to the A2 and B1 inputs of multiplexer 58. Upon the occurrence of an additional seven shifts, the information bit appears at the B2 output of shift register 56 and is applied to the A1 and B2 inputs to the multiplexer 58. Six shifts later, the information bit appears at the Q output of flip-flop 59. The $\bar{Q}$ output of the flip-flop 58 thereupon transitions to a logic zero level which is applied to the C2 and D1 inputs of multiplexer 58.

The 32 bit shift register comprised of shift registers 44, 52, 55 and 56 affords the opportunity to examine an information bit as it proceeds through a four microsecond observation window. As will be further described, each information bit may be identified as a data bit or a clock bit. The clock bits thereafter are stripped from the MFM encoded information stream to provide NRZ data at the B3 output of shift register 64. The NRZ data and synchronization strobes from gate 84 are forwarded to the data format unit 16a as will be further explained.

As before described, the Q output of flip-flop 41 transitions to a logic one level when a logic one appears in an MFM encoded information stream appearing at the D2 output of connector 40. In response thereto, the flip-flop 41 is set until it is again reset by the B7 output of shift register 44. During the time period that the flip-flop 41 is set, the flip-flop 62 may be reset by multiplexer 58 and the flip-flop 48 may be triggered to indicate the presence of a data bit.

The inputs of each stage of the multiplexer 58 are selected by the Q output of flip-flop 61. More particularly, when the Q output of flip-flop 61 is at a logic one level, the A2, B2, C2 and D2 inputs to the multiplexer 58 respectively are selected to the M1–M4 outputs. When the Q output of flip-flop 61 is at a logic zero level, however, the A1, B1, C1 and D1 inputs to the multiplexer are selected. The M1 output of multiplexer 58 controls the setting of flip-flop 62. The M2 output of the multiplexer triggers the flip-flop 48, and controls the setting of flip-flop 54. The M3 output of multiplexer 58 triggers flip-flops 62 and 63, and the M4 output controls the setting of flip-flop 48. The multiplexer 58 thus provides timing strobes for identifying a clock bit, a data bit or logic zero data occurring in any two microsecond information bit cell.

The flip-flops 60 and 72 interact to reset flip-flops 48, 62, and 54. The flip-flop 61 thereupon is triggered by the $\bar{Q}$ output of flip-flop 62. If the flip-flop 61 is not in a reset condition, the Q output of the flip-flop transitions to a logic one level to indicate that the last logic one detected in the MFM information stream was a clock bit. In that event, the Q output of flip-flop 54 transitions to a logic one level and the Q output of flip-flop 48 transistions to a logic zero level in a manner to be further explained. The Q output of flip-flop 54 thereupon is applied through gates 65 and 76 to strobe the logic zero output of flip-flop 48 into shift register 64.

Each time that a data bit occurs in the MFM information stream supplied by the disc device 17, the Q output of flip-flop 48 transitions to a logic one level and the Q output of flip-flop 54 transitions to a logic zero level. The Q output of flip-flop 48 is applied through OR gate 65 and AND gate 76 to strobe the shift register, thereby loading the Q output into the shift register.

The Q output of flip-flop 54 transitions to a logic one level, and the Q output of flip-flop 48 transitions to a logic zero level when the presence of logic zero data in an information bit cell is detected by the flip-flop 54. The Q output of flip-flop 54 further is applied through gates 65 and 76 to strobe the logic zero output of flip-flop 48 into the shift register 64. Each time that shift register 64 is strobed, therefore, a logic one is shifted downward in the shift register if a data bit is detected. A logic zero is shifted downward in the shift register, however, if either a clock bit or logic zero is detected.

When a clock strobe is generated at the output of gate 65, a synchronization clock signal also is supplied by way of gate 84 to the I2 input of connector 40. Further, NRZ (non-return-to-zero) data is provided at the B3 output of shift register 64, and applied by way of data line 79 to the data format line 16a. From the data format unit, the serial information stream is rounted through the disc controller 14 to the common bus 10 of FIG. 1.

As illustrated in FIG. 4, the address mark field of a formatted information stream recorded on the disc device 17 is preceded by a gap field of hexidecimal FF's, and an address preamble field of hexidecimal 55's. The counter 81 counts the number of 55's occurring in the address preamble field. When a count indicating a predetermined number of 55's occurs, the count is held stationary. More particularly, each time a logic zero appears at the B2 output of shift register 64 concurrently with a logic one at the B3 output of the shift register, the counter 81 is incremented. In the preferred embodiment as disclosed herein, the counter 81 reaches a maximum count upon the occurrence of 16 counts indicating the occurrence of four bytes of hexidecimal 55's. The carry-out output of the counter 81 thereupon transitions to a logic one level to disable the gate 75, thereby preventing a counter wrap-around. The maximum count in the counter 81 is maintained until the end off the address preamble field is detected by the gate 77. More particularly, the B5 and B6 outputs of shift register 64 are at different logic levels when the address preamble field is being addressed by the logic system of FIG. 5. In that event, the output of gate 77 remains at a logic one level, and the counter 81 remains at the maximum count. When the B5 and B6 outputs of register 64 are identical, however, gate 77 disables gate 82 to reset the counter 81. The counter 81 thus serves to indicate that the read head of the disc device is in close proximiy to the address mark field of the information stream.

When the carry-out output of counter 81 transitions to a logic one level, the Q output of flip-flop 63 transitions to a logic one level upon the occurrence of a logic one pulse at the M3 output of multiplexer 58. The occurrence of an address mark within the address mark field thereby is indicated, and the AND gate 84 is enabled to provide a synchronization signal by way of connector 40 to the data format unit 16a.

The output of OR gate 68 remains at a logic zero level until either the counter 81 or the flip-flop 63 provide an address mark signal. During the period that the output of OR gate 68 is at a logic zero level, the gate 67 is disabled to reset the flip-flop 61. The flip-flop 61 remains reset until after a logic zero in the high order half-byte of the address mark field of the MFM encoded information stream is detected. In that event, the output of gate 77 transitions to a logic zero to effect the resetting of counter 81. The output of OR gate 68 in response thereto transitions to a logic one level to disable the reset input to flip-flop 61. The output of gate 68 thus provides a protection against the detection of clock bits other than in the low order half-byte of the address mark field and in the data field of the MFM encoded information stream.

FIG. 6

Figure 6:
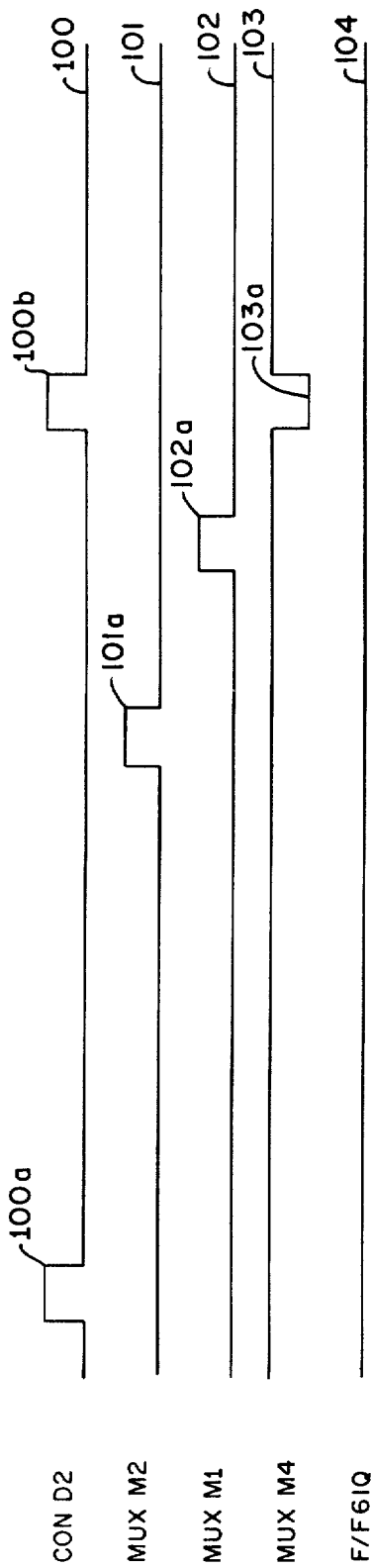
FIGS. 6–9 are timing diagrams of the operation of the logic system of FIG. 5 in response to data patterns received from the disc device of FIG. 1.

FIGS. 6–9 illustrate graphically the operation of a logic system of FIG. 5 in response to selected data patterns. FIG. 6 more particularly illustrates the operation of the logic system upon the occurrence of data bits four microseconds apart in the MFM encoded information stream provided at the D2 output of the connector 40.

Referring to FIG. 6, a waveform 100 illustrates a logic data signal occurring at the D2 output of connector 40, waveform 101 illustrates a logic signal occurring at the M2 output of multiplexer 58, a waveform 102 illustrates a logic signal occurring at the M1 output of the multiplexer and a waveform 103 illustrates a logic signal occurring at the M4 output of the multiplexer. A waveform 104 is an illustration of the Q output of the flip-flop 61.

Upon the occurrence of a first data bit pulse 100a of waveform 100, flip-flops 41 and 42 are triggered and the data bit pulse is loaded into the shift register 44. In response thereto, the output of gate 49 transitions to a logic zero to reset flip-flop 42. The data bit thereafter is shifted down the shift register 44 in response to the 8 MHz clock signal appearing at the D4 output of the connector 40. One microsecond after being loaded into the shift register 44, the data bit appears at the B7 output of the shift register to reset the flip-flop 44. A half microsecond later, the data bit appears at the B3 output of shift register 52 to trigger the flip-flop 54.

Upon the occurrence of eight additional clock pulses at the D4 output of connector 40, the data bit appears at the B3 output of shift register 55 and is applied to the A2 and B1 inputs of multiplexer 58. For purposes of this illustrative example, the preceding information bit occurring in the MFM encoded information stream is presumed to have been a data bit. The Q output of flip-flop 48 is at a logic one level, therefore, and the $\bar{Q}$ output of the flip-flop is at a logic zero level. The flip-flop 61 thus is in a reset condition indicating that the previous information bit was not a clock bit. In response thereto, the multiplexer 58 is selected to the A1, B1, C1 and D1 inputs. The M2 output of multiplexer 58 thereby is raised to a logic one level as illustrated by waveform 101 at 101a to trigger the flip-flop 48. Since no logic one pulses occur in the information stream at this time as illustrated by waveform 101, the Q output of flip-flop 41 is at a logic zero level and the $\bar{Q}$ output of the flip-flop is at a logic one level. The output of gate 46 therefore is at a logic zero level to set the flip-flop 54. The $\bar{Q}$ output of the flip-flop 48 and the Q output of the flip-flop 54 thus transition to a logic one level. The $\bar{Q}$ output of flip-flop 48 is applied through gate 67 to disable the reset input to flip-flop 61. The Q output of flip-flop 54 is applied to gate 65, the output of which transitions to a logic one level to provide a synchronization strobe at the output of gate 84. Upon the occurrence of a next 125 nanosecond clock pulse at the D4 output of connector 40, the Q output of flip-flop 60 transitions to a logic one level to enable gate 76 and strobe a logic zero into the shift register 64. Thereafter, the Q output of flip-flop 60 is clocked through the flip-flop 72, and the $\bar{Q}$ output of flip-flop 72 transitions to a logic zero level to reset the flip-flops 62, 54 and 48. Since the flip-flop 62 was in a reset condition previously, the flip-flop 61 is not triggered. The Q output of flip-flop 61 thus remains at a logic zero level as illustrated by waveform 104.

Approximately 0.875 microseconds after the data bit illustrated by pulse 101a appears at the B3 output of shift register 55, the data bit is provided at the B2 output of shift register 56. The M1 output of multiplexer 58 thereupon transitions to a logic one level as indicated by the pulse 102a of waveform 102. Since the Q output of flip-flop 41 is at a logic zero level, however, no further responses to the data bit occur at this time.

Approximately 0.75 microseconds later, the data bit represented by pulse 100a appears at the Q output of flip-flop 59. The Q̄ output of the flip-flop thus transitions to a logic zero level, and the M4 output of multiplexer 58 also transitions to a logic zero level as illustrated by waveform 103 at 103a to set the flip-flop 48. The Q output of the flip-flop 48 thereupon transitions to a logic one level which is applied to the shift register 64, and the gate 57 which resets shift registers 55 and 56. The Q output of flip-flop 48 also is applied through gates 65 and 76 to strobe the shift register 64. A data bit thereby is loaded into the NRZ information stream appearing at the B3 output of the shift register.

In summary, the logic system of FIG. 5 first detected the data pulse 100a and thereafter predicted that the pulse 100b also was a data pulse. As will become apparent from the description which follows, the rule of operation of the logic system is that logic one pulses four or two microseconds apart are identifed as being of the same type. Logic one pulses appearing three microseconds apart, however, are identified as being of different types. That is, one shall be identified as a data pulse while the other shall be identified as a clock pulse.

This rule of operation is compatible with an MFM encoded information stream, wherein each information bit cell is two microseconds wide and is comprised of both a clock bit half-cell and a data bit half-cell.

FIG. 7

Figure 7:
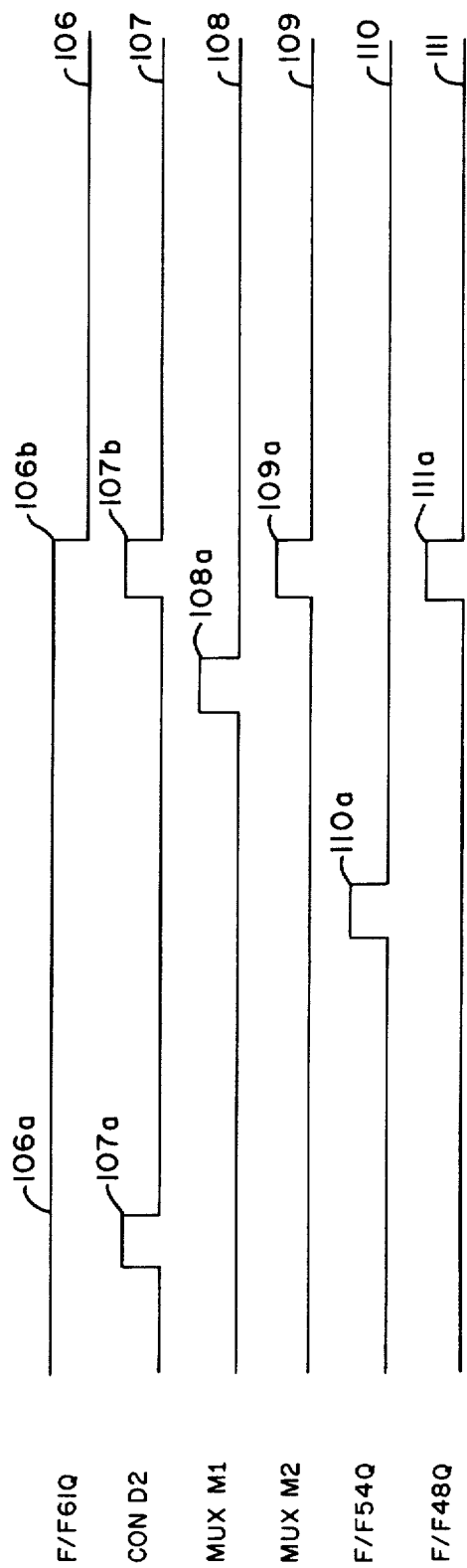

FIG. 7 illustrates the operation of the logic system of FIG. 5 in response to an MFM encoded information stream having a data bit pulse occurring three microseconds after a clock bit pulse.

A waveform 106 illustrates the Q output of flip-flop 61, a waveform 107 illustrates the D2 output of connector 40, a waveform 108 illustrates the M1 output of multiplexer 58, a waveform 109 illustrates the M2 output of multiplexer 58, a waveform 110 illustrates the Q output of flip-flop 54 and a waveform 111 illustrates the Q output of flip-flop 48.

In the information stream, a block bit pulse 107a of waveform 107 occurs to trigger the flip-flops 41 and 42. As illustrated by waveform 106, the Q output of flip-flop 61 is at a logic one level. The multiplexer 58 thus is selected to its A2, B2, C2 and D2 inputs.

The clock bit pulse is shifted down through the shift register 44 as before described, and appears at the B3 output of shift register 52 approximately 1.50 microseconds after the time of occurrence of pulse 107a. The logic one pulse at the B3 output of shift register 52 triggers the flip-flop 54, and the Q output of the flip-flop transitions to a logic one level as illustrated by pulse 110a of waveform 110 to indicate the presence of logic zero data. Pulse 110a is applied to OR gate 65 to generate a clock strobe for the shift register 64. The logic zero level at the Q output of flip-flop 48 as illustrated by waveform 111 thereupon is loaded into the shift register 64.

The clock pulse continues to be shifted downward through the shift register 52, and appears at the B3 output of shift register 55 approximately 2.50 microseconds after the time of occurrence of pulse 107a. The M1 output of multiplexer 58 thereupon transitions to a logic one level as illustrated by pulse 108a of waveform 108. Since no logic one pulses occur at this time in the information stream illustrated by waveform 107, the Q output of flip-flop 41 is at a logic zero level. The set input of flip-flop 62 thus remains disabled.

Approximately 0.875 microseconds later, the clock bit pulse appears at the B2 output of shift register 56. The M2 output of multiplexer 58 thereupon transitions to a logic one level as illustrated by pulse 109a of waveform 109. In response thereto, the flip-flop 48 is triggered. Since the Q output of flip-flop 41 is at a logic one level in response to the data bit pulse 107b, the Q output of the flip-flop 48 transitions to a logic one level as illustrated by pulse 111a of waveform 111. A logic one data pulse thereby is applied to the D input of the shift register 64, and further applied through gates 65 and 76 to strobe the shift register. It is thus seen that a logic one pulse occurring in the information stream three microseconds after a clock bit pulse is identifed as a data bit pulse.

When the Q output of flip-flop 48 transitions to a logic one level, the Q̄ output transitions to a logic zero level to reset the flip-flop 61. Thus, the Q output of the flip-flop 61 transitions to a logic zero level as illustrated by waveform 106 at 106b to indicate that the last logic one pulse detected was not a clock pulse.

FIG. 8

Figure 8:
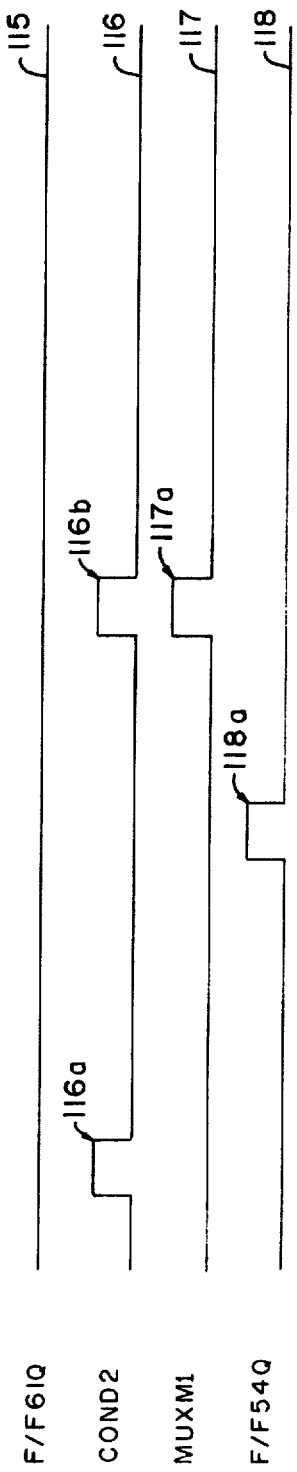

FIG. 8 illustrates the operation of the logic system of FIG. 5 in response to an MFM encoded information stream wherein two clock pulses occur two microseconds apart.

A waveform 115 illustrates the Q output of flip-flop 61, a waveform 116 illustrates the D2 output of connector 40, a waveform 117 illustrates the M1 output of multiplexer 58 and a waveform 118 illustrates the Q output of flip-flop 54.

Upon the occurrence of a first logic one clock pulse 116a of waveform 116, the flip-flops 41 and 42 are triggered. Since the Q output of flip-flop 61 as illustrated by waveform 115 is at a logic one level, an immediately preceding clock pulse is presumed. The clock pulse 116a is loaded into the shift register 44, and shifted downward to the B3 output of shift register 52 in approximately 1.50 microseconds. In response thereto, the flip-flop 54 is triggered, and the Q output of the flip-flop transitions to a logic one level as illustrated by pulse 118a of waveform 118. The flip-flop 54 output further is applied through OR gates 65 and 70 to the D input of flip-flop 60. Upon the occurrence of a next clock pulse at the D4 output of connector 40, the Q output of flip-flop 60 transitions to a logic one level to strobe the Q output of flip-flop 48 into register 64. Since no logic one data pulses occur in the information stream illustrated by waveform 116 at this time, the Q output of flip-flop 48 is at a logic zero level.

Approximately 1.00 microseconds later, the clock pulse illustrated by pulse 116a appears at the B3 output of shift register 55. Since the Q output of flip-flop 61 is at a logic one level as illustrated by waveform 115, the multiplexer 58 is selected by the A2, B2, C2 and D2 inputs. Thus, the B3 output of shift register 55 appears at the M1 output of the multiplexer as illustrated by pulse 117a of waveform 117. At this time, a second clock pulse 116b occurs in the MFM information stream at the D2 output of connector 40 to trigger flip-flops 41 and 42. In response thereto, the output of gate 47 transitions to a logic zero level to set the flip-flop 62. The Q output of flip-flop 61 thus remains at a logic one level as illustrated by waveform 115 to indicate that a clock pulse has been detected.

The operation of the logic system of FIG. 5 as above described has identified pulses occurring two microseconds apart as being of the same type. Pulse 116b thus is identified as a clock pulse as was pulse 116a.

FIG. 9

Figure 9:
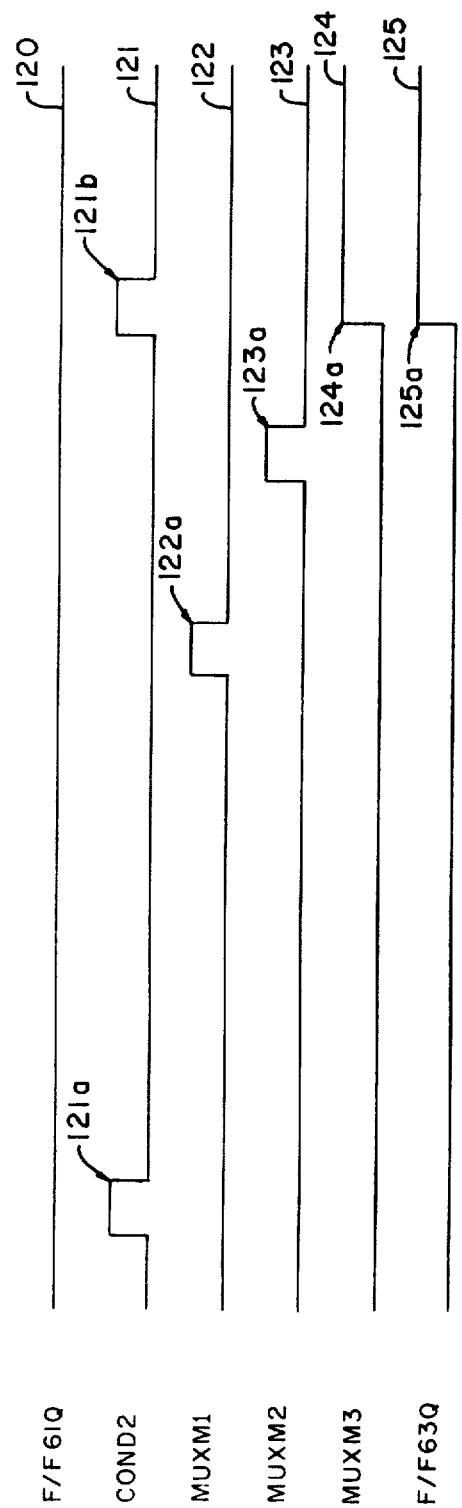

FIG. 9 illustrates the operation of the logic system of FIG. 5 when two clock bit pulses occur in the MFM information stream four microseconds apart.

A waveform 120 illustrates the Q output of flip-flop 61, a waveform 121 illustrates the D2 output of connector 40, a waveform 122 illustrates the M1 output of multiplexer 58, a waveform 123 illustrates the M2 output of the multiplexer, a waveform 124 illustrates the M3 output of the multiplexer and a waveform 125 illustrates the Q output of flip-flop 63.

When a first clock bit pulse 121a of waveform 121 occurs at the D2 output of connector 40, the flip-flops 41 and 42 are triggered. The clock bit pulse is applied to the shift register 44 by the flip-flop 42, and shifted downward to appear at the B3 output of shift register 52 approximately 1.50 microseconds after the occurrence of pulse 121a. No logic one pulses occur in the information at this time as illustrated by waveform 121. The Q outputs of flip-flops 41 and 48 thus are at a logic zero level. The flip-flop 54 is triggered by the B3 output of multiplexer 58, and the Q output of the flip-flop transitions to a logic one level to strobe the Q output of flip-flop 48 into shift register 64 as before described. Upon a next occurring clock pulse at the D4 output of connector 40, the Q output of flip-flop 54 further is applied through flip-flop 60 to flip-flop 72. The $\bar{Q}$ output of flip-flop 72 transitions to a logic zero level 125 nanoseconds later, and in response thereto the flip-flops 48, 54 and 62 are reset. Since the logic state of the Q output of flip-flop 61 remains at a logic one level as illustrated by waveform 120, the multiplexer 58 is selected to the A2, B2, C2 and D2 inputs.

The clock bit pulse represented by pulse 121a thereafter is shifted downward to appear at the B3 output of shift register 55 approximately 2.50 microseconds after the time of occurrence of pulse 121a. The M1 output of multiplexer 58 thereupon transitions to a logic one level as illustrated by pulse 122a of waveform 122. Since the Q output of flip-flop 41 is at a logic zero level during the time period of pulse 122a, no further responses occur in the logic system. Approximately 0.875 microseconds later, the clock bit pulse appears at the B2 output of shift register 56. The M2 output of multiplexer 58 thereupon transitions to a logic one level as illustrated by pulse 123a of waveform 123. Since no logic one pulses occur at this time in the information stream illustrated by waveform 121, the $\bar{Q}$ output of flip-flop 41 is at a logic one level. The output of gate 46 thus transitions to a logic zero level in response to the M2 output of multiplexer 58, and the flip-flop 54 is placed in a set condition. The Q output of flip-flop 54 transitions to a logic one level and is applied through gates 65 and 76 to strobe the logic zero at the Q output of flip-flop 48 into the shift register 64 as before described.

The clock bit pulse represented by pulse 121a thereafter appears at the Q output of flip-flop 59 approximately 1.625 microseconds after the occurrence of pulse 123a. The $\bar{Q}$ output of the flip-flop thereupon transitions to a logic zero level which appears at the M3 output of multiplexer 58. The flip-flop 59 is triggered by clock pulses supplied at the D4 output of connector 40, and the $\bar{Q}$ output remains at a logic level until the trailing edge of the clock bit pulse represented by pulse 121a is shifted out of the flip-flop. The $\bar{Q}$ output thereupon transitions to a logic one level which is applied through the M3 output of multiplexer 58 as indicated at 124a of waveform 124 to trigger flip-flops 62 and 63. The Q output of flip-flop 62 thereupon transitions to a logic one level which is applied through OR gate 57 to reset shift registers 55 and 56. The Q output further is applied to gate 70 to generate a strobe to shift register 64 as before described.

The Q output of flip-flop 63 also transitions to a logic one level as illustrated by waveform 125 at 125a. The occurrence of an address mark in the address mark field of an MFM information stream thereby is indicated. This condition can occur only in the high order byte of the address mark field.

The information bit process rate in identifying clock or data bit types is increased by identifying bits occurring less than 1.25 information bit cell periods or more than 1.75 information bit cell periods apart as being of the same type, and by identifying bits occurring between 1.25 and 1.75 information bit cell periods apart as being of different types. The bit process rate further is enhanced by removing an information bit from the input shift register when the information bit has been identified as a data bit or a clock bit.

Having described the invention in connection with certain specific embodiments thereof, it is to be understood that further modifications may now suggest themselves to those skilled in the art, and it is intended to cover such modifications as fall within the scope of the appended claims.

What is claimed is:

1. A logic read recovery system compatible with integrated circuit implementation and requiring no tuning adjustments for converting an MFM encoded information stream characterized by plural information bit cells received from a mass storage medium to an NRZ information stream for transfer through a data format unit to a mass storage controller, which comprises:
   (a) bit cell access means in electrical communication with said storage medium for providing a plural information bit cell window for sensing said MFM information stream;
   (b) multiplexer means receiving selected samples of said MFM information stream from said bit cell access means for supplying timing strobes to control the operation of said read recovery system;
   (c) information identification means responsive to said multiplexer means and said bit cell access means for indicating the presence of clock bits, data bits and logic zero data in said MFM information stream;
   (d) synchronization strobe generator means in electrical communication with said information identification means and said data format unit for removing an information bit cell from said bit access means upon the identification of a clock bit or a data bit in said information bit cell;
   (e) address mark detection means in electrical communication with said multiplexer means, said bit cell access means and said strobe generator means for detecting an address mark indicating the presence of a data field in said MFM information stream and for inhibiting both the identification of clock bits and the transfer of NRZ information to said storage controller until after said address mark is detected; and (f) NRZ conversion means in electrical communication with said information identification means and said address mark detection means and responsive to said strobe generator means for issuing a logic one level when a data bit is identified, and a logic zero level when either a clock bit or logic zero data is identified in said MFM information stream to form said NRZ information stream.

2. A logic read recovery stream compatible with integrated circuit implementation and requiring no tuning adjustments for converting an MFM encoded information stream received from a mass storage medium to an NRZ information stream for transfer through a data format unit to a mass storage controller, which comprises:

(a) information bit detection means in electrical communication with said storage medium for indicating the occurrence of information bits in said MFM information stream;

(b) bit cell access means in electrical communication with said information bit detection means and responsive to said storage controller for providing plural information bit cells in parallel;

(c) multiplexer means receiving selected samples of said MFM information stream from said access means for supplying timing strobes to control the operation of said read recovery system;

(d) address mark detection means responsive to said information bit detection means and said multiplexer means for signalling the near proximity of a data field in said MFM information stream;

(e) clock bit detection means in electrical communication with said multiplexer means, said information bit detection means and said address mark detection means for identifying those information bits in said data field which are clock bits;

(f) data bit detection means in electrical communication with said information bit detection means and responsive to said multiplexer means for identifying those information bits which are data bits;

(g) logic zero data detection means in electrical communication with said access means, said multiplexer means, said information bit detection means and said clock bit detection means for signalling the occurrence of logic zero data in said MFM information stream;

(h) NRZ conversion means in electrical communication with said data bit detection means and said logic zero data detection means for issuing a logic one level when a data bit is identified, and a logic zero level when either a clock bit or logic zero data is identified in said MFM information stream to form an NRZ information stream; and (i) synchronization strobe generator means in electrical communication with said clock bit detection means, said data bit detection means, and said logic zero data detection means for supplying a synchronization strobe when NRZ data is to be transferred from said NRZ conversion means to said storage controller.

3. A digital hardware method of detecting clock bits, data bits and logic zero data occurring in an MFM encoded binary information stream formatted into a gap field, an address preamble field, an address mark field and a data field, and forming from said MFM information stream a train of synchronization strobes and an NRZ information stream, which comprises:

(a) accessing plural contiguous information bit cells in said MFM information stream;

(b) sensing said plural information bit cells to detect the presence of information bits in said MFM information stream;

(c) indicating the occurrence of a clock bit if an information bit is detected in the leading half of an information bit cell, if an information bit is detected which is separated less than 1.25 or more than 1.75 information bit cell time periods from an immediately preceeding clock bit, or if an information bit is detected which is separated between 1.25 and 1.75 information bit cell time periods from an immediately preceeding data bit;

(d) sensing said plural information bit cells to detect the presence of an address mark in said address mark field, thereby indicating the presence of said data field for conversion of said NRZ information stream, and inhibiting the indication of clock bits in step (c) until said address mark is detected;

(e) indicating the occurrence of a data bit in said MFM information stream if an information bit is detected in said gap field or said address preamble field, if an information bit is detected which is separated between 1.25 and 1.75 information bit cell time periods from an immediately preceeding clock bit, or if an information bit is detected which is separated less than 1.25 or more than 1.75 information bit cell time periods from an immediately preceeding data bit;

(f) indicating the occurrence of a logic zero data if an information bit is identified as a clock bit in step (c), or if the occurrence of neither a clock bit nor a data bit is indicated in an information bit cell;

(g) forming said NRZ information stream by issuing a logic one level each time the occurrence of a data bit is indicated and issuing a logic zero level each time the occurrence of a clock bit or logic zero data is indicated;

(h) generating synchronization strobes upon the detection of said address mark and in response to the detection of a clock bit, a data bit or logic zero data in said plural information bit cells to control the transfer of said NRZ information stream to a mass storage controller; and (i) selectively sampling cell portions of said plural information bit cells to provide timing strobes for synchronizing the operation of steps (a)–(h).

* * * * *